United States Patent
Hockaday

(10) Patent No.: US 10,254,011 B2
(45) Date of Patent: Apr. 9, 2019

(54) PHOTOVOLTAIC MODULE MOUNTING TO RUBBER TIRES

(71) Applicant: Energy Related Devices, Inc., Tucumcari, NM (US)

(72) Inventor: Robert G. Hockaday, Los Alamos, NM (US)

(73) Assignee: Energy Related Devices, Inc., Tucumcari, NM (US)

(*) Notice: Subject to any disclaimer, the term of this patent is extended or adjusted under 35 U.S.C. 154(b) by 449 days.

(21) Appl. No.: 14/243,446

(22) Filed: Apr. 2, 2014

(65) Prior Publication Data

US 2014/0290720 A1 Oct. 2, 2014

Related U.S. Application Data

(60) Provisional application No. 61/807,422, filed on Apr. 2, 2013.

(51) Int. Cl.

| H01L 31/042 | (2014.01) |
|---|---|
| F24S 25/617 | (2018.01) |
| H02S 20/00 | (2014.01) |
| H02S 20/30 | (2014.01) |
| H02S 40/38 | (2014.01) |
| H02S 20/10 | (2014.01) |
| F24S 25/13 | (2018.01) |

(Continued)

(52) U.S. Cl.
CPC ............ *F24S 25/617* (2018.05); *F24S 25/11* (2018.05); *F24S 25/13* (2018.05); *H02S 20/00* (2013.01); *H02S 20/10* (2014.12); *H02S 20/30* (2014.12); *H02S 40/38* (2014.12); *F24S 2025/802* (2018.05); *F24S 2080/015* (2018.05); *Y02B 10/10* (2013.01); *Y02B 10/20* (2013.01); *Y02E 10/47* (2013.01); *Y02E 10/50* (2013.01)

(58) Field of Classification Search
CPC ......... H01L 31/0422; H01L 3131/0422; H02S 20/00; H02S 20/10; H02S 20/30; H02S 40/38; F25J 25/617; F25J 25/13; F25J 25/11
USPC ........................................ 136/243
See application file for complete search history.

(56) References Cited

U.S. PATENT DOCUMENTS

| 5,605,282 | A | * | 2/1997 | Snead | ........... | E01B 3/46 |
| | | | | | | 238/109 |
| 7,799,987 | B1 | * | 9/2010 | Hines | ........... | F24J 2/0472 |
| | | | | | | 126/600 |

(Continued)

FOREIGN PATENT DOCUMENTS

| EP | 2171769 A2 | 4/2010 |
| EP | 2394108 A2 | 12/2011 |

*Primary Examiner* — Matthew T Martin
(74) *Attorney, Agent, or Firm* — James Creighton Wray; Meera P. Narasimhan

(57) ABSTRACT

A photovoltaic panel mounting system utilizes rubber tires to anchor and position photovoltaic panels to face the sun and resist wind forces. The shaded interior cavity of the rubber tires physically and thermally protects electronics and batteries. The tires may be filled with soil, concrete, water, or aggregate to provide further ballasting, enabling a photovoltaic mount system to withstand high velocity winds. Telescoping conduits may house wiring for the system and allow for resizing and reshaping of the mounting system. The mounting system decreases used tire waste and provides low cost components and portability.

35 Claims, 10 Drawing Sheets

(51) Int. Cl.
*F24S 25/11* (2018.01)
*F24S 80/00* (2018.01)
*F24S 25/00* (2018.01)

(56) References Cited

U.S. PATENT DOCUMENTS

| | | | |
|---|---|---|---|
| 7,832,176 B2 | 11/2010 | McCaskill et al. | |
| 8,418,419 B1 * | 4/2013 | Aseere | F24J 2/5205 |
| | | | 136/251 |
| 8,537,554 B1 | 9/2013 | Hockaday | |
| 2006/0042683 A1 * | 3/2006 | Gangemi | H01L 31/02008 |
| | | | 136/252 |
| 2006/0266406 A1 | 11/2006 | Faust et al. | |
| 2007/0017567 A1 * | 1/2007 | Gronet | H01L 31/02167 |
| | | | 136/246 |
| 2007/1018423 | 8/2007 | Hockaday et al. | |
| 2008/0245360 A1 * | 10/2008 | Almy | F24J 2/525 |
| | | | 126/600 |
| 2009/0242014 A1 * | 10/2009 | Leary | F24J 2/5239 |
| | | | 136/251 |
| 2009/0250099 A1 * | 10/2009 | Pan | H01L 31/052 |
| | | | 136/248 |
| 2011/0049992 A1 * | 3/2011 | Sant'Anselmo | F03D 9/007 |
| | | | 307/64 |
| 2013/0314774 A1 * | 11/2013 | Page | G02B 5/04 |
| | | | 359/361 |
| 2015/0059381 A1 * | 3/2015 | Hoffmann | H02S 10/40 |
| | | | 62/235.1 |

\* cited by examiner

PHOTOVOLTAIC MODULE MOUNTING TO RUBBER TIRES

This application claims the benefit of U.S. Provisional Application No. 61/807,422, filed Apr. 2, 2013, which is hereby incorporated by reference in its entirety.

BACKGROUND OF THE INVENTION

Photovoltaic module systems require a mounting system to be used need be held to face the sun and resist the forces created by wind, rain, hail, and snow. Conventional mounting rack systems utilize a rack that clamps the photovoltaic panel or modules by the edge or edge frame. The rack is then attached to beams to the mounting surface such as a roof, wall, or ground. The attachment can be through screws into the mount surface, such as ground screws into the ground, wood screws into roof joists, or bolts and nuts into steel beam roofs. The rack can also be held against the mounting surface by gravity by weighting the rack with concrete weights. Pilings or cast concrete have also been used to hold racks to the ground.

These mounting systems are expensive because they use a high quantity of virgin materials and require a high energy content to manufacture and transport to the installation site. They are also labor intensive to install.

These systems have typically been designed to withstand 90 mile per hour (mph) wind speeds, while situations exist in hurricane zones where photovoltaic systems may be required to resist wind forces resulting from 120 mph to 185 mph wind speeds.

Battery energy storage systems and associated electronics use battery boxes located in separate structures. Energy storage in this manner requires that explosive gasses are vented from the batteries out of those structures. Because these structures are often placed in convenient locations where they receive direct sunlight or are located within a heated structure, the temperature of the storage systems may be above ideal battery operating and energy storage conditions.

Needs exist for an economical mounting structure for photovoltaic panels that can withstand high wind forces and provide energy storage.

SUMMARY OF THE INVENTION

The present invention utilizes one or more rubber tires as a mount for a photovoltaic panel. A means of securely gripping tire walls is accomplished through the use of a interposing the tire between a combination of plates, beams, bolts, rivets, harpoons, ratchets, or pins. This securing assembly holds the photovoltaic panel above the rubber tire. The rubber elastic mount performs as a shock mount, elastically distributing forces over time. This may reduce peak forces on the panel resulting from wind gusts, hail impacts, and vibrations incident on the mounting surface such as those caused by earthquakes or truck transport.

A photovoltaic panel mounting system of plates and tubes attached to rubber tires to position allows photovoltaic panels to face the sun and resist wind forces. Used rubber tires have a rollable shape, strength, elasticity, weight, size, and coefficient of friction, sufficient to provide a robust and portable mount. The shaded interior cavity of the rubber tires can physically and thermally protect electronics and batteries. Filled tires with soil, concrete, water, or aggregate can provide further ballasting to enable a photovoltaic mount system to withstand high velocity winds, increase portability, and have the added advantage of utilizing discarded tires.

Discarded tires can be used as a low cost ballast and structural mount for photovoltaic panels. In many areas of the world discarded rubber tires are major waste problem because they degrade very slowly in the environment, cannot be easily compacted into landfills, and are costly to disassemble due to structural toughness and complexity. Discarded rubber tires sourced from local waste sites may be used to replace virgin materials such as concrete, steel, and aluminum, significantly reducing the cost of the system. The tires may be filled with dirt or water as a ballast that is much less expensive than concrete. The ballasted mounting of the present invention allows the photovoltaic system to be fielded or moved with significantly smaller site penetration than conventional ground penetration mounting, such as concrete footers or pilings. The ballasted mounting assemblies of the present invention may be suitable for roofs, fallow agricultural fields, pastures, mud flats, and brown sites (landfills and hazardous material burial sites).

The tires may be filled with concrete and enable a central tube or pole to be mounted to the tire. The central tube or pole enables the ballasted tire to be leveraged with a tube and rolled. Rubber tires and filled rubber tires can also be lifted and transported with machinery such as forklifts, because when a tire on its side may present a wedge opening at the base where the steel forks can slip under the tire. A concrete filled tire with a central tube can be used as ground pad ballast for photovoltaic array mounting. A rotation shaft can be mounted on the central tube structure to provide a rotational photovoltaic mount. Struts can be mounted to the central tube to provide a truss structure for photovoltaic mounting systems.

To achieve cooling flow around the photovoltaic panel and to orient the photovoltaic panel toward the sun, the panel may be elevated above the rubber tire through the means of struts, beams, posts, pedestals, or plates. This elevation means can be attached to the rubber tires to position the photovoltaic panels above the rubber tires. The elevation means, reinforced mounting of the panels, and ballasting may be sufficiently robust to withstand the forces of high winds from 90 mph to 185 mph.

The sheltered and shaded interior of the tire can be used to store electrical components, batteries, ballast, pumps, and water. Many electronics and batteries perform optimally in a temperature range of roughly 0° C. to 25° C. This temperature range is close to the average ground temperature in many parts of the world. By thermally coupling the electronics to the ground and sheltering them from air flow and direct heating from the sun, optimal performance is achievable in many parts of the world. Furthermore, temperature stability may be improved by painting the tire with a coating that reflects visible light and filling the interior or side cavities of the tire with a material that has high thermal capacity, such as water or hydrating salts. Packing the interior cavity of the tire with thermal insulation and placing insulation over the center of the tire can further enhance the temperature stability of the cavity. Radiating heat into the night sky while blocking the infrared emissions from the photovoltaic panel during the day can also cool of the sheltered cavity. Ventilating the sheltered cavity only when outside air temperatures drops below the ground average temperature the cavity can also decrease the average temperature of the cavity.

Wiring can be connected between the between tire mounted photovoltaic modules and outside electrical connections via telescoping conduit tubes. Clamps may secure the conduits to photovoltaic modules and enable adjustable spacing between photovoltaic modules. The telescoping conduit may also enable electrical connections to be placed inside the conduit and slack electrical wiring to be coiled inside the conduit, thus avoiding protecting wiring from exposure to extreme temperatures. The telescoping electrical conduit is mounted to the photovoltaic panels above the rubber tire and may avoid running wiring underground. This is useful where burial of wiring is extra expense or forbidden, such as on brown field sites.

These and further and other objects and features of the invention are apparent in the disclosure, which includes the above and ongoing written specification, with the drawings.

DETAILED DESCRIPTION

Figure 1:
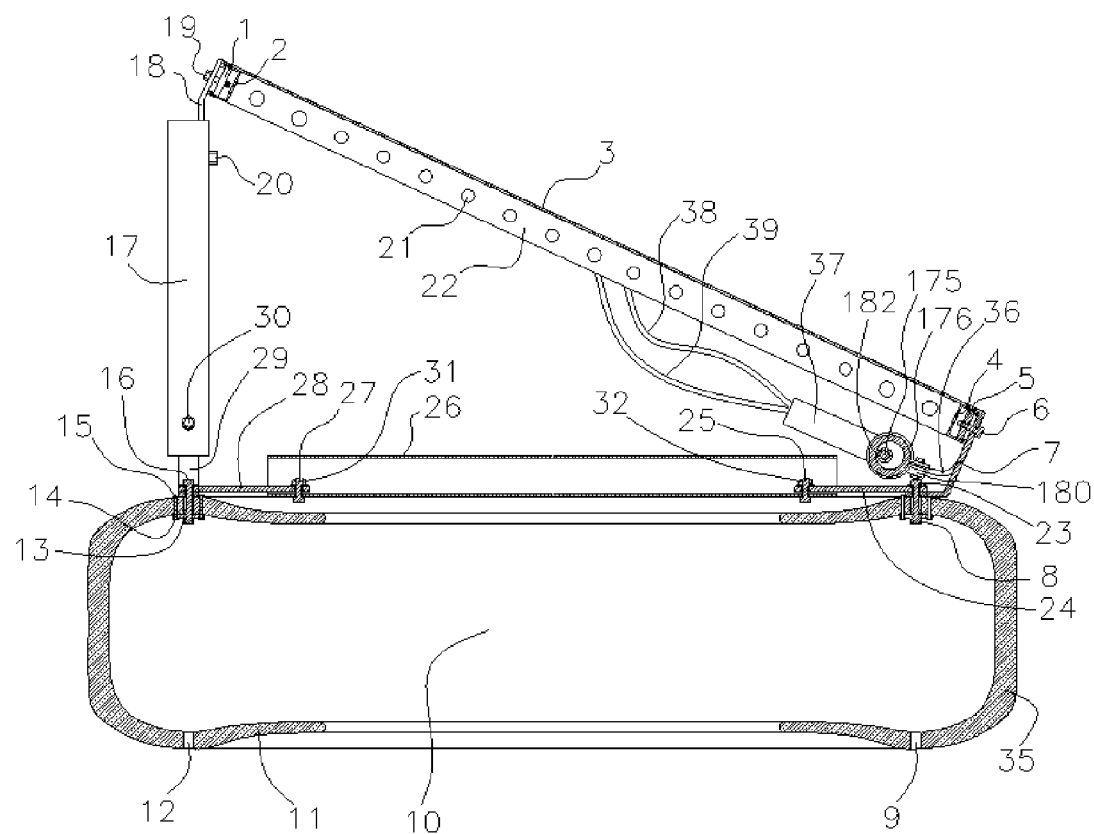
FIG. 1 shows a cross-sectional view of a photovoltaic panel mounted to a rubber tire.

Several embodiments of the invention are illustrated with variations in assembly and arrangement. The following numbers identify elements within the drawings:

FIG. 1 Cross-sectional view of photovoltaic panel mounted to rubber tire.
1. Sliding nut
2. Channel beam (Unistrut)
3. Photovoltaic panel glass and photovoltaic cells laminate
4. Channel beam (Unistrut)
5. Sliding nut
6. Bolt
7. Bent plate
8. Hanger flange
9. Drain hole
10. Interior of tire
11. Side wall of tire
12. Drain hole
13. Hanger flange
14. Blind rivet expansion end
15. Blind rivet flush head
16. Bolt
17. Metal tube
18. Bent plate
19. Bolt
20. Nut
21. Air flow holes in heat sink fin
22. Back surface of photovoltaic heat sink fin
23. Bolt
24. Plate
25. Bolt
26. Cross-section of tube
27. Bolt
28. Plate
29. Bent plate
30. Nut
31. Nut
32. Nut
33. Glue bead
34. Glue bead
35. Tire wall
36. Bent plate
37. Micro-inverter
38. DC electrical wire
39. DC electrical wire
FIG. 2 Cross-sectional enlarged view of mounting to rubber tire
40. Bolt head
41. Bent plate
42. Flat plate
43. Washer
44. Bolt
45. Nut
46. Tire side wall
47. Rivet flush head
48. Rivet expanded
49. Hanger flange
50. Flared rivet end
51. Hanger flange
52. Flared rivet end
53. Washer
54. Bolt
55. Tube strut
FIG. 3 Back side view of photovoltaic panel mounted on rubber tire
56. Micro-inverter
57. DC electrical wire
58. DC electrical wire
59. Panel junction box
60. Bent plate
61. Bolt
62. Sliding nut
63. Bolt
64. Tube strut
65. Channel beam (Unistrut)
66. Hole in Channel beam
67. Heat sink fin
68. Tube strut
69. Sliding washer
70. Bolt
71. Bent plate
72. Side Channel beam
73. Hole in Channel beam
74. Bolt
75. Bent plate
76. Bent plate
77. White painted rubber tire
78. Tube strut
79. Bolt
80. Slit in telescoping conduit
81. Band clamp
82. Small diameter telescoping conduit
83. Large diameter telescoping conduit
84. Band clamp
85. Band clamp
86. Side Channel beam
87. Bolt
88. Channel beam 89. Head of rivet
90. Tube strut
91. Photovoltaic panel
   FIG. 4 Cross-sectional view of soil filled rubber tire mount
100. Soil fill
101. Air gap
102. Air gap
103. Ground screw
104. Slot washer
105. Slot washer
106. Ground screw
107. Slot washer
108. Slot washer
   FIG. 5 Cross-sectional view of concrete filled tire
110. Ground
111. Center tube
112. Concrete fill
113. Bubble in tire
114. Bubble in tire above concrete
115. Tire
116. Ground screws
117. Ground screw head
118. Slot washer
119. Slot washer
120. Hole in tire for bolt
121. Blind rivet
122. Blind rivet
123. Hanger flange
   FIG. 6 Cross-sectional view of center post mounted 2-axis tracking array with friction drive
125. Lipless edge seal (fillet)
126. Photovoltaic laminate: glass, photovoltaic cells and encapsulants
127. Outer tube bearing
128. Inner tube bearing shaft
129. Motor mount
130. Lipless edge
131. Shaft tilt motor
132. Electric motor rotor
133. Electric motor stator
134. Motor bearing
135. Motor bearing
136. Motor shaft
137. Friction wheel
138. Rotor of motor
139. Stator of motor
140. Tilt rotation traction surface and panel support frame
141. Air flow holes
   FIG. 7 Battery placed in tire central cavity and ground thermal contact
150. Top cover for battery compartment
151. Battery case
152. Battery electrode
153. Battery electrolyte
154. Physical and thermal contact between battery container and battery
155. Vent hole
156. Vent of battery compartment
157. Vent between tire cavity and outside air
158. Lower battery box
159. Upper laminate actuator valve
160. Apertures in battery compartment cover
161. Lower laminate actuator valve
162. Water or gel
163. Bladder wall
164. Electronics
165. Water collection channel
   FIG. 8 Telescoping conduit tubing
175. High voltage electrical wiring
176. Band clamp
177. Band clamp
178. Smaller diameter tube
179. Electrical wire bend
180. Metal plate with holes
181. Band clamp
182. Outer tube
183. Band clamp
184. Slit in outer tube
185. Slit in outer tube
186. Outer tube
187. Bolt cross section
188. Metal plate with holes
189. Dielectric insulation on electrical wire
190. Electrical connector
   FIG. 9 Water bladder ballasted tire mount
220. Wheel
221. Water or water gel
222. Bladder
223. Air volume
   FIG. 10 Polar axis rotating photovoltaic panel mount with multiple rubber tire pads
250. Rubber tire
251. Concrete or wheel
252. Securing bolt into tire assembly
253. Bolt in tube strut
254. Bent plate
255. Tube
256. Beam cross
257. Axial nut or snap ring
258. Axial nut or snap ring
259. Axial rod
260. Axial nut or snap ring
261. Axil nut or snap ring
262. Twisted bent plate
263. Twisted or bent plate
264. Telescoping back tube strut
265. Telescoping back tube strut
266. Bolt
267. Hole
268. Rubber tire mount
269. Rubber tire mount
270. Rubber tire mount
271. Rubber tire mount
272. Horizontal strut
273. Horizontal strut
274. Horizontal strut
275. Horizontal strut
276. Horizontal strut
277. Horizontal strut
278. Horizontal strut
279. Ground
280. Elevated strut
281. Elevated strut
282. Elevated strut
283. Bent plate
284. Bent plate
285. Bent plate
286. Smaller diameter tube strut
287. Bolt FIG. 1 shows a photovoltaic panel 3 mounted to a rubber tire 35. The photovoltaic panel 3 has a heat sink fin 22 mounted to the back side of the photovoltaic panel 3 to cool and strengthen the panel 3. Heat sink fins 22 are glued to the back of the panel 3 with a stress relief structure and a heat sink fin backing, as described in U.S. Pat. No. 8,537,554. Holes 21 in the heat sink fins 22 allow cooling air flow through the fins 22 and reduce the boundary layer of air flowing across the surface of the fins 22. A channel beam frame 2, 4 goes around the photovoltaic panel 3 on the back side of the laminate and is glued to the frame 2, 4 such that the edge of the laminate is covered and the surface flush with the glass outer surface of the laminate. The heat sink fins 22 are welded or glued to the channel beam frame 2, 4. The flush or lipless front surface may prevent water, snow, and dirt from collecting on the edges of the photovoltaic panels 3 and obscuring light reaching the photovoltaic panels 3. The channel beam frame 2, 4 is gripped between sliding nuts 1, 5, bolts 6, 19, and the bent plates 7, 18 with holes in them. The sliding nuts 1, 5 enable the plates 7, 18 to be slid along the edge of the panels 3.

A plate 36 is mounted on the lower edge of the photovoltaic panel 3 and attaches to a micro-inverter 37. The DC electrical output of the photovoltaic panel 3 is delivered through wires 38, 39 to the micro inverter 37. In one embodiment, voltages in the direct current (DC) electrical wires 38, 39 are below 40 volts and do not pose a significant shock hazard. Additionally, the wires 38, 39 may be prevented from extending out from the perimeter of the photovoltaic panel 3, avoiding accidental tripping, crushing, breaching, or shocking animals or personnel. The DC wires 38, 39 are not covered by a conduit.

In one embodiment, the alternating current (AC) output of the micro-inverter 37 is typically 240 volts and needs to traverse between multiple photovoltaic panels 3 and the electrical load or power grid connection. Thus, the AC wires 175 are covered with a plastic or metal conduit 182 to prevent accidental tripping, crushing, breaching, or shocking animals or personnel. The electrical conduit 182 is shown in cross section and has a band clamp 176 that attaches to a plate 180. The plate 180 is attached to the attachment plates 36 on the micro inverter 37 and the channel beam frame 4 of the photovoltaic panel 3. Bolting and securing the electrical conduit provides strain relief protection of the AC electrical wiring 175.

Bent plates 7, 18, 24, 28, 29, are attached with bolts 19, 20, 25, 27, and nuts 30, 31, 32 to tubes 17, 26 to form strut positioning supports for the photovoltaic panel 3 on the rubber tire 35. The strut positioning supports further facilitate tilting the panel. The tubes 17, 26 and plates 7, 18 24, 28, 29 are bolted to the tire 35.

Discarded tires 35 are prepared for use as a mount by drilling a plurality of holes in the tire. In one embodiment, eight holes are drilled in the tire 35. In FIG. 1, only two holes 9, 12 are shown. The holes 9, 12 drilled in the tire sidewall 35 facing the ground side may be used to drain water that collects in the interior 10 of the rubber tire 35. The side of the tire 35 facing away from the ground may have a central threaded hole and two side holes and may support one or more Hanger flanges 8, 13.

Small holes to accommodate rivets 14, 15 may be drilled in the side wall 11 of the rubber tire 35. The rivets 14, 15 are driven through the side wall 11 and expanded on the other side of the Hanger flange 8, 13 to secure the Hanger flange 8, 13 to the interior of the rubber tire 35. Bolts 16, 23 may pass through the Hanger flange 8,13 and the bent plates 7, 24, 28, 29 to attach them together.

By securing the threaded plates 8, 13 to the inside of the tire 35 with flush rivets 14, 15, the struts may not require bolts. This may allow the tire 35 to have a smooth outer surface that may facilitate rolling without catching. Such a smooth outer surface may not be possible if threaded bolts were attached to the side wall of the tire 35. A plate or large washer would be used to distribute the force over the surface of the tire 35. The plate or large washer and one or more bent plates may grip the side walls of the tire 35.

Figure 2:
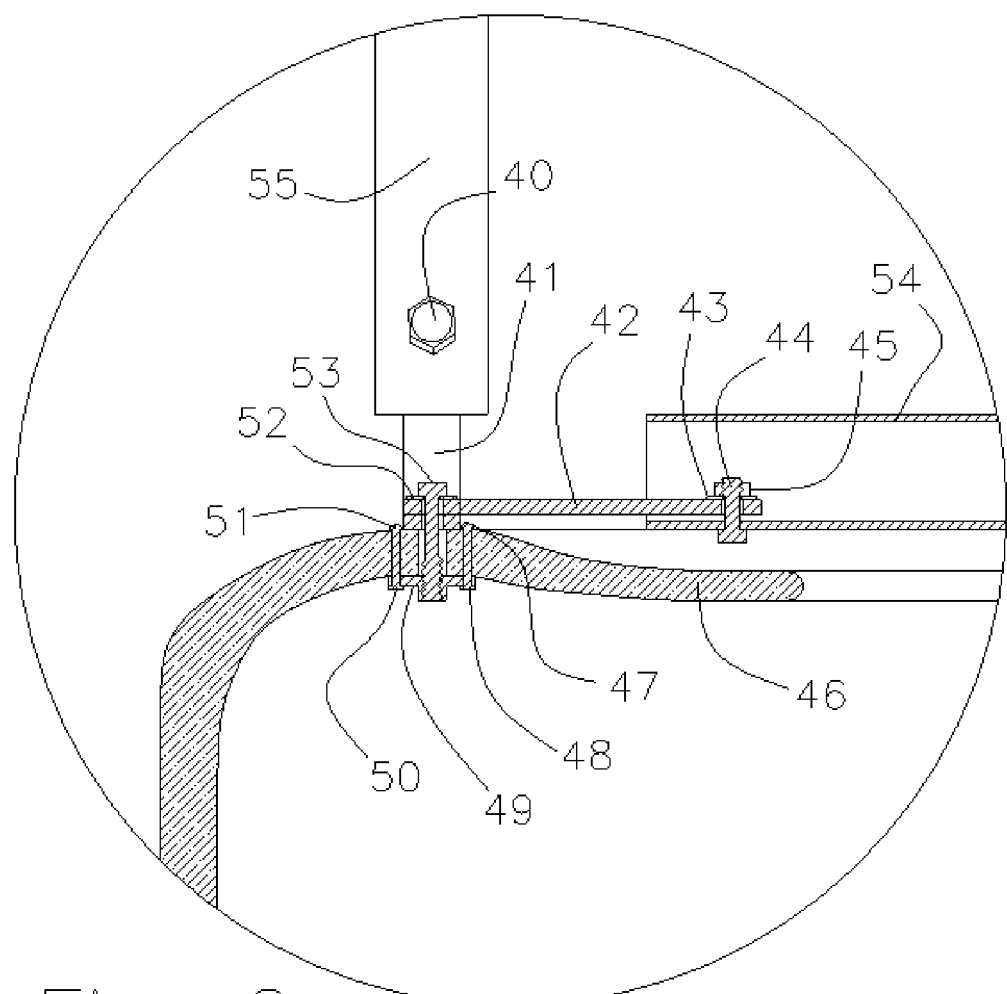
FIG. 2 shows an enlarged cross-sectional view of the mounting device and rubber tire.

An enlarged cross-sectional view of the plate mounting to the wall of the rubber tire is shown in FIG. 2. Holes are drilled in the sidewall 46 of the rubber tire 35. A large hole to accommodate a bolt 53 is drilled into the sidewall 46 as well as two smaller holes to accommodate rivet attachments 47, 48, 50, 51. Hanger flange 49 is placed on the inside wall of the tire 46 and two blind rivets 47, 48, 50, 51 secure the Hanger flange 49 from the outside of the tire by expanding the rivet end 48, 50 on the outer surface of the Hanger flange 49.

Placing the Hanger flange 49 on the inside of the tire side wall 46 may allow the outer surface of the tire 35 to remain smooth, with only flush rivet heads 47, 51 exposed on the outside of the tire 35. This outer smooth surface of the tire may enable the tire 35 to be trucked and rolled into placement without significantly snagging or catching external surfaces.

To field the tire mount for photovoltaic panels 3, the tire 35 is rolled into place and tube-plate struts 40, 41, 42, 43, 44, 45, 54, 55 are secured over the Hanger flange 49 by a bolt 53 and washer 52 through holes in the plates and threaded into the Hanger flange 49 clamping to the side wall 46 of the rubber tire 35.

In the enlarged cross-sectional view of FIG. 2, the cross-section goes between the horizontal plate 42 and tube strut 54 that go between the tire mounts. The vertically rising plate tube strut 55 goes to the edge of the photovoltaic panel 3. The plates 41, 42 are secured to the tubes 54, 55 by means of bolts 44 with bolt heads 40, nuts 45, and washers 43. The bolts 44 pass through holes in the plates 41, 42 and tubes 54, 55 and clamps the plates on the interior curving surface of the tubes 54, 55. The plates 41, 42 center themselves on the interior curving surfaces of the tubes 54, 55. When the nuts 45 and bolts 44 are tightened, they deform the tubes 54, 55 to create cradles for the plates 41, 42, preventing the plates 41, 42 from rotating around the single bolts 44. The vertical plate 41 is bent to enable the plate 42 to lay flat on the tire bolting point, and the tube 55 tilts up toward the attachment point on the photovoltaic panel 3.

Figure 3:
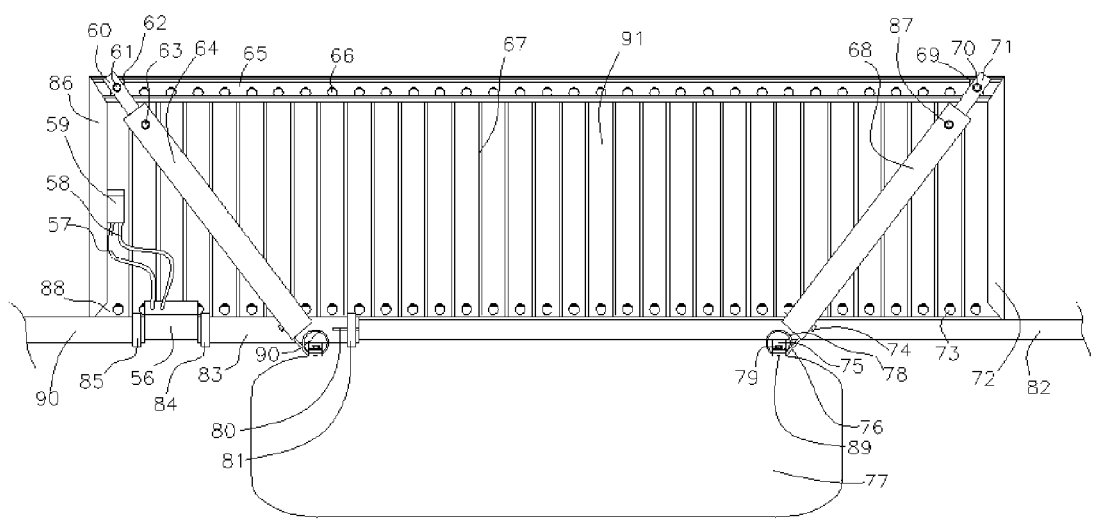
FIG. 3 shows a back view of a photovoltaic panel mounted on a rubber tire.

FIG. 3 shows the backside view of the photovoltaic panel 91 mounted on a rubber tire 77. The rubber tire 77 may be painted with a white reflective paint on the outer exposed surfaces that contains titanium dioxide pigments. Painting the tire 77 may aid to reflect UV light and reduce the temperature of the interior cavity of the tire 77, and to absorb UV light and extend the life of the tire 77. Other colors of paint may be used to match esthetic desires.

Bent plates 75, 76 are bolted to the side walls of the rubber tire 77. The plates 75, 76 are bolted to the tube struts 68, 78, 64. Tube struts 68, 78, 64 are attached with plates 60, 71, bolts 61, 63, 70, 87, and sliding nuts 62, 69 to the channel beams 65, 88 of the photovoltaic panel 91.

In one embodiment, the tube struts 68, 78, 64, 90 are placed on a truck tire with a diameter of 44 inches. The placement and angles of the struts 68, 78, 64, 90 were chosen to increase the stiffness of the mounting structure, such that the natural resonate frequency is greater than three Hertz, much higher than a one Hertz aerodynamic oscillation flutter regime for a rectangular panel 91 of 30 by 60 inches.

The horizontal struts 78, 90 provide stiffness against rolling motion into the rubber tire 77 that can occur if the horizontal strut is not used. Such a rolling motion may lead to potentially damaging twisting stresses on the edge of the frame 88 of the photovoltaic panel 91.

For low cost and high strength performance, the channel beams 65, 72, 86, 88 and heat sink fins 67 are made of galvanized steel. In high corrosion environments such as marine environments, or where light-weight materials are needed, channel beams 65, 72, 86, 88 and heat sink fins 67 may be made from aluminum or fiberglass plastic resin composites (obtainable from Unistrut, 4205 Elizabeth, Wayne, Mich. 48184). A fiberglass composite is a dielectric and may not require grounding of the edge frame 65,72,88, 86. A range of materials is possible for the channels beams 65, 72, 86, 88, plates 62, 71, 75, 76, 90, tubes 64, 68, 78, 90, nuts, and bolts 61, 62, 63, 69, 70, 87, 74, 75 to meet environmental needs, conditions of the application, and system performance. Such materials include painted steel, galvanized steel, aluminum, polyvinylchloride (PVC), plastic, nylon, polyester, and glass fiber reinforced polymer resins. Plastic components with dielectric properties can useful in some applications where non-corroding and non-electrical conduction is useful.

The channel beams 65, 72, 86, 88, and fins 67 have holes 66, 73 drilled in them to allow air flow across the back of the photovoltaic panels 91. Holes are also drilled into the tube struts 64, 68, 78, 90 and rectangular plates 60, 71, 75, 76. Bolts 63, 87, 74 attach plates 60, 71, 75, 76 to the inside of the tube struts 64, 68, 78, 90 with the use of nuts and washers.

The position of the bolt point in the tube struts 64, 68, 78, 90 can be adjusted to allow different mounting angles of the photovoltaic panel 91 in relation to the plane of the rubber tire 77. The length of the tubes 64,68 can be cut to match the desired tilt in the photovoltaic panels 91. Sliding and securing the slider nuts 62, 69 at different positions along the channel beam 65 allows adjustment of the tilt on the photovoltaic panel 91.

The channel beams 65, 72, 86, 88, if formed from steel or aluminum, may be welded at the corners. Heat sink fins 67 made with sheet metal or expanded metal mesh (steel or aluminum) may be attached to the back of the photovoltaic panel 91 and spot welded.

The DC electrical output from the photovoltaic panel comes out through a junction box 59 mounted on the photovoltaic panel 91. The DC electrical output from the junction box goes to the micro-inverter 56 through two electrical cables 57, 58. The high voltage output of the micro-inverter 56 is delivered into wires inside the telescoping electrical conduit 90, 83, 82 which may be formed from PVC, plastic, or galvanized steel. The telescoping electrical conduit 90, 83, 82 is secured with band clamps 81, 84, 85 that hold ends of the larger diameter of the conduit 83, 90 and slides over the smaller diameter of the conduit tubing 82. The outer tube 83 is slotted 80 on four sides of the end of the tube to allow the band clamp 81 to squeeze the outer tube 83 and reduce the diameter of the outer tube to grip the inner conduit tube 82. During assembly, paraffin wax or Teflon powder may be rubbed on the surface the inner tube 82 to avoid sticking and repel water ingress.

Figure 4:
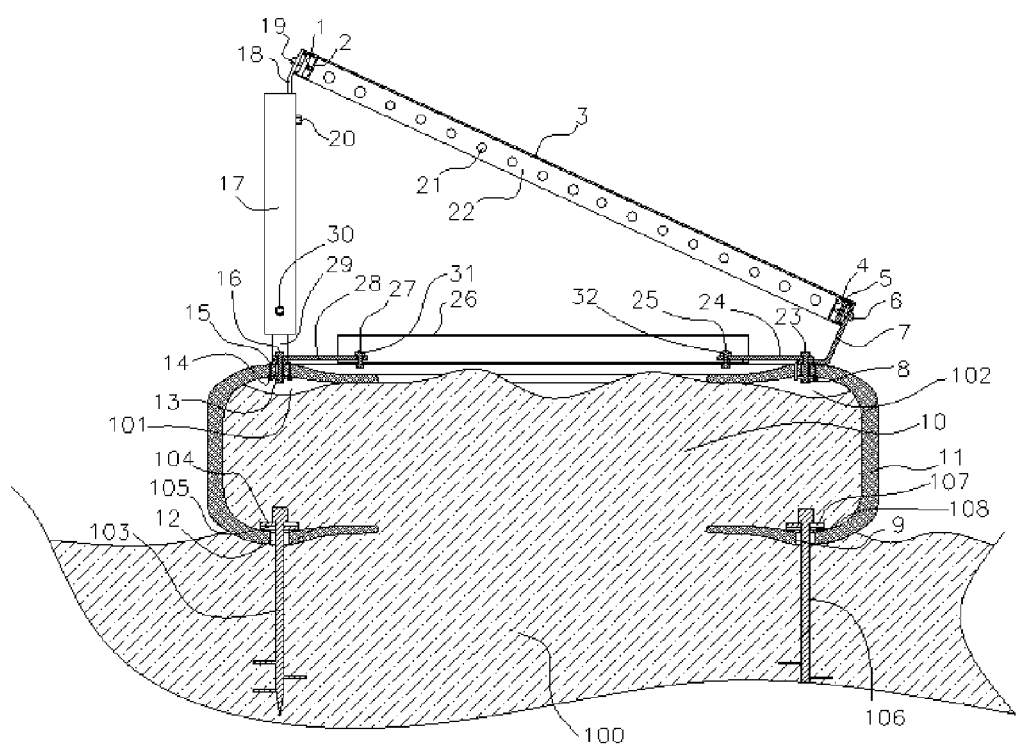
FIG. 4 shows a cross-sectional view of a soil filled rubber tire mount.

In FIG. 4, the photovoltaic panel 3 is mounted on a rubber tire 11. The tire cavity 10 is filled with dirt 100 to weight the tire down and resist wind force tending to lift the photovoltaic panel 3. The unfilled tire 11 can be pushed over the ground, and the ground can be shaped to position the tire 35 at a desired position and tilt angle before filling tire cavity 10 to preserve the position. Filling the tire cavity 10 with soil also secures the tire to the ground to reduce settling or sliding movement, and discourages theft by increasing the weight of the entire assembly. A typical discarded truck tire 11 weighs 140 lbs. Loading the tire 11 with dirt can increase the weight of the tire 11 to 840 lbs. and the total weight with the panel 3 to 960 lbs.

Air gaps 101, 102 may be left inside the tire cavity 10 next to the Hanger flanges 8, 13 to avoid fouling the Hanger flanges 8, 13 and bolts 16,23. The entire bolt 2, 6, 16, 19, 20, 23, 25, 30 connections can be welded or locked with glue to also avoid loosening and theft.

Maximum upward lift force that a photovoltaic panel 3 could experience was predicted by assuming an air foil shape of NACA 23012 with a coefficient of maximum lift of 1.7, air temperature of 16° C., and air pressure of 1 Bar. The maximum wind speeds expected from United States building codes range from 90 mph to 120-185 mph in hurricane zones. The lift on a typical rectangular photovoltaic panel 3 with dimensions of 30 by 60 inches (1.26 square meters) is 844 lbs. in a 90 mile per hour (mph) wind speed. Therefore, dirt filling the rubber tire 11 will meet the ballasting needed for 90 mph zoned areas.

For hurricane zones, the uplift force for a photovoltaic panel 3 could be as high as 1500 lbs. for 120 mph wind speeds and 3600 lbs. for 185 mph wind speeds. In this case, a greater securing force than dirt filling the tire 11 will be needed to hold the system to the ground. Ground screws 103, 106 may be run through the drain holes 9, 12 in the bottom of the tire 11 and slotted washers 107, 108 may be inserted under the top ends of the ground screws 103, 106. The drain holes 9,12 in the side wall of the tire 11 may also be used to drain water from the tire cavity 11.

Figure 5:
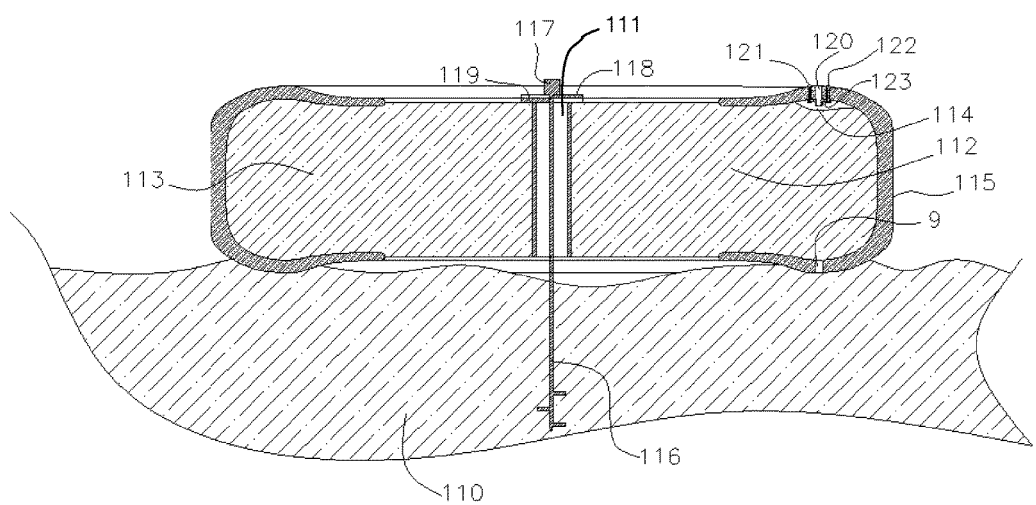
FIG. 5 shows a cross-sectional view of a concrete filled rubber tire mount.

FIG. 5 shows a tire 115 filled with concrete 112, 113. A central tube 111 is placed in the center of the tire 115. Concrete 112 has a density roughly twice that of dry dirt, thus enabling the ballasting of a truck tire 115 to reach 1600 lbs. to 1700 lbs. This weight may be sufficient to hold a panel down in a 120 mph wind speed.

The concrete can be cast on soil with a polyethylene sheet to contain the bottom center of the tire 115 as a form. A central tube 111 is placed with a plug in the bottom of the tube and a removable plastic plug. Plastic or steel bolts with Teflon or wax coating may be threaded into the Hanger flanges 123 to avoid ingress of concrete 112 into the Hanger flanges 123. A void 114 may be created inside the tire 115 when filling the tire 115 with concrete 112 to avoid fouling or blocking access to the Hanger flanges 123. Removable plastic plugs are placed in the drain holes 9 on the tire side walls. Once the concrete 112 is set, the drain plugs and tube plug are removed.

The tire 115 may be pried and rolled using the central tube 111 and an axial tube or rod. The central tube enables the pry and roll moving steps so that several workers may be able to move the heavy tire 115 and mounts into position on a solar energy collection site. By using a ramp and an axial through the central tube 111, the tire 115 and mounts can be loaded into and unloaded from trucks.

Once the tires 115 are placed at the solar energy collection site, photovoltaic panels 3 can be mounted to the tire 115 through the bolts attaching to the Hanger flanges 123 inside the side walls of the rubber tire 115. Securing the Hanger flanges 123 to the tire 115 may be achieved through the use of blind rivets 121, 122, expanding bolts, ratchet bolts, harpoons, casting in concrete nuts or studs, or adhesives.

To withstand the maximum lift forces of 185 mph wind speeds, ground screws 116 can be placed in the center tube 111, screwed into the ground 110, and secured with two slot washers 118, 119 under the head 117 of the ground screw 116. Ground screws 116 could also be screwed into the ground and the concrete filled tire 115 placed over the head 117 of the ground screw with two slot washers 118, 119 secured to the surface of the concrete and tube 111. To increase the height and weight of the tire mounts 115, tires or tire mounts 115 may be bolted together through the center tubes 111 in stacks or bolted together through side wall holes 9.

Figure 6:
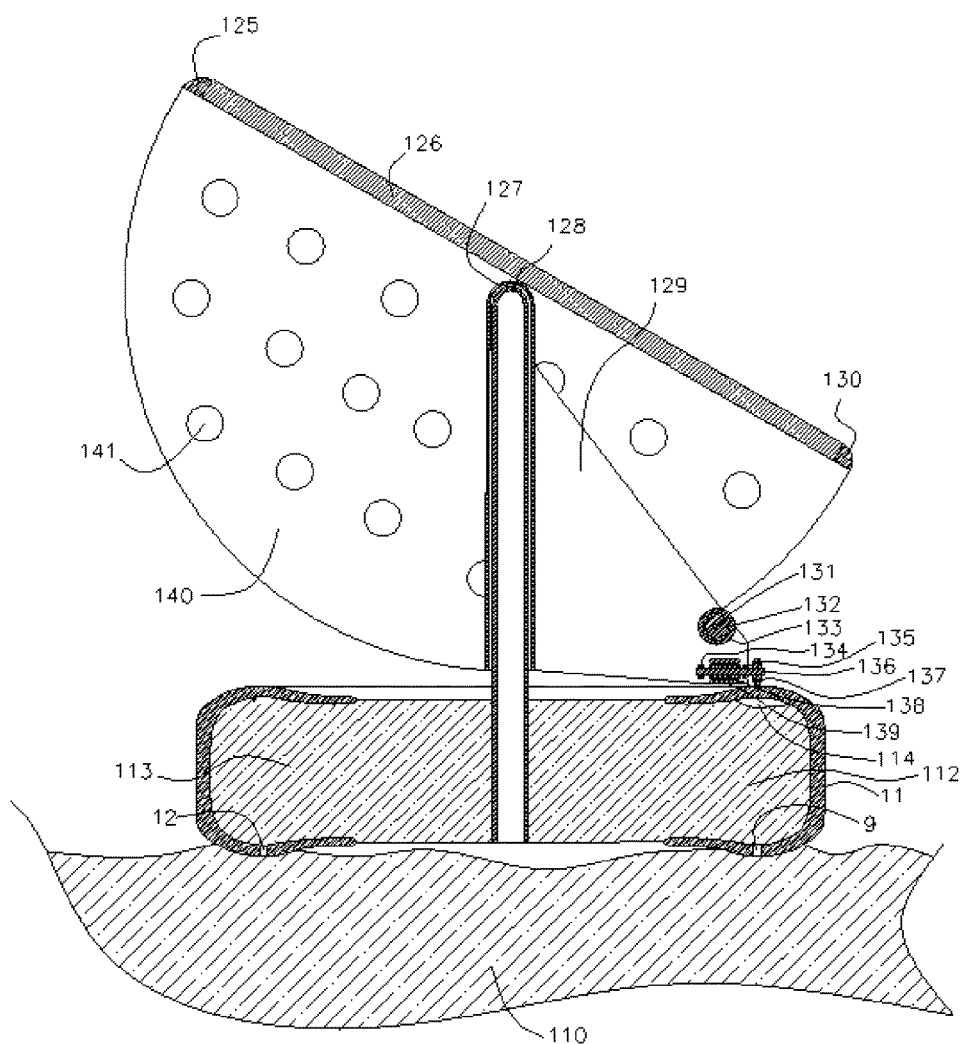
FIG. 6 shows a cross-sectional view of a center post mounted two-axis tracking array with friction drive.

FIG. 6 is a cross-sectional view of a tire 11 mount filled with concrete 112, 113. A central axial post 128 is cast into the concrete 112, filling the rubber tire 11. The central axial post 128 may have dents, bumps, or protuberances to enable concrete 112 to securely grip the central post. The central post 128 may have a bearing cap end that fits within an outer journal sleeve 127. A plate or box 129 is made as part of the outer journal sleeve 127, and friction wheel motors 131, 132, 133, 134, 135, 136, 137, 138, 139 are attached to the outer edges of the plate or box 129. The first two directional electric motors as shown with bearings 134, 135, rotor 138, and stator 139 will drive the photovoltaic panel assembly 125, 126, 129, 130, 140 and journal sleeve 127 in azimuthal rotation with a friction wheel 137 in contact on the rubber surface of tire side wall 11. The second motor 131, 132, 133, with shaft 131, rotor 132 and stator 133 with friction wheel contact to the rotation frame 140, drives changes in the tilt of the panel mount frame. Ventilation holes 141 are placed in the panel mount frame 140 to allow air flow crosswise across the back of the photovoltaic panel 126. The panel mount frame 140 supports and is glue bonded to the back of the photovoltaic panel laminate 126. A lipless bead of glue 125, 130 is shown protecting the edge of the photovoltaic panel 126 and being flush to the surface of the photovoltaic panel 126.

Figure 7:
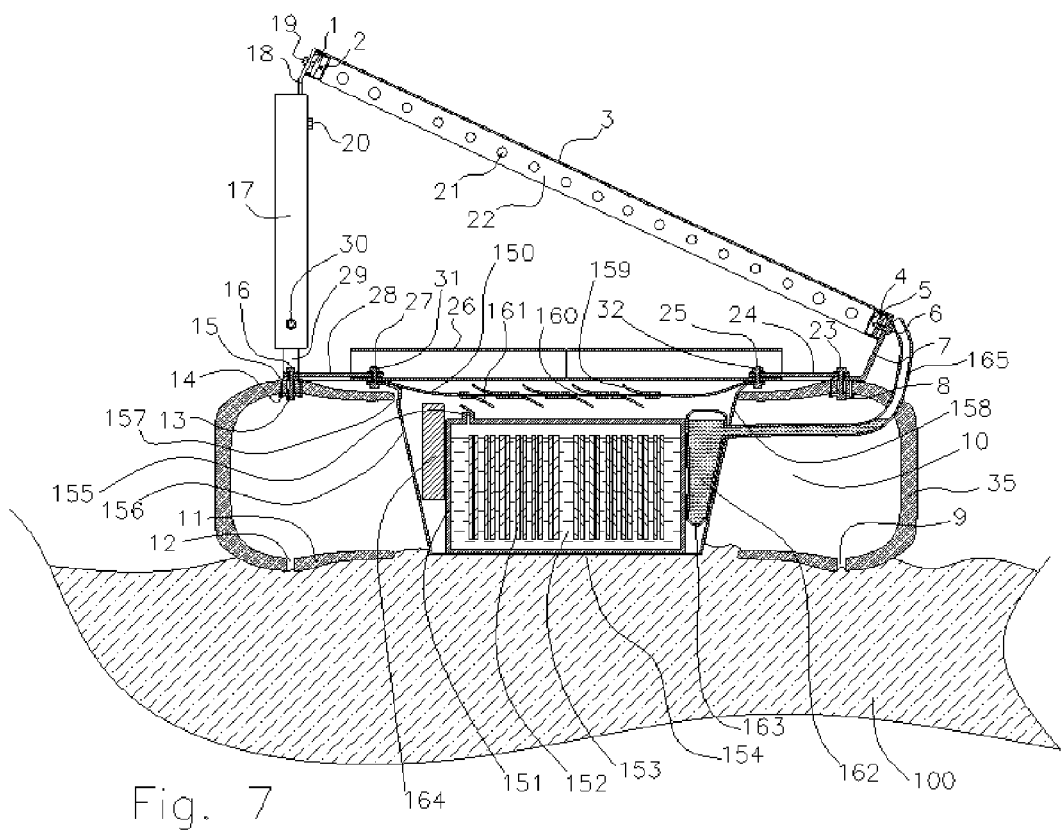
FIG. 7 shows a battery placed in the central cavity of a tire and ground thermal contact.

FIG. 7 shows a cross-sectional view of the photovoltaic panel 3 mounted on a rubber tire 35 with a battery 151 and electronics disposed inside the tire cavity and mounted to the ground. In this embodiment example, the photovoltaic laminate 3 is secured to the side walls 11 of the rubber tire 35 with Hanger flanges 8, 13, bolts 6, 16, 19, 20, 23, 25, 27, 30, nuts 31, 32, rivets 14, 15, tube struts 17, 26, channel beams 2, 4, slider nuts, and the back side heat sink fins 22, with ventilation holes 21.

A battery compartment 158, 150 which may be made of plastic or metal is shown secured with the bolts 25, 27 on the lateral tube 26 strut plates 24, 28. The battery compartment 158, 150 could also be secured to separate holes in the strut plates 24, 28 or the tire grip bolts 16, 23. The battery compartment 158, 150 may be placed within the central cavity of the tire 10 with a lip that rests on the inner rim wall 157 of the rubber tire 35. In this case, the battery compartment 158, 150 may not be attached to the plates 24, 28 or struts 26. A battery 151 and electronics 164 may be placed in the battery box 158, 150.

The battery compartment 158, 150 and battery 151 may be arranged to have a low center of gravity such that if the tire side wall cavity 10 were filled with a buoyant material, the system could stably float. This includes that the battery compartment may extend bellow the lower plane of the tire 35 and into the dirt 100. The electrode 152 and electrolyte 153 of the battery 151 are shown in cross section in FIG. 7.

A gas vent 155 is shown on the battery case 151 and vent on the side of the battery box 156. A vent route along the inner tire rim 155 out of the tire cavity 10 is needed to allow hydrogen and other gases to diffuse from the battery 151 to the outside air and dissipate before gases build up to an explosive concentration inside the battery case 151, the battery compartment 158, 150 and the tire cavity 10.

A battery box cover 150 is placed over the battery 151 and protects the battery 151 and or electronics 164 from blown rain and dust. The battery box cover 150 is shown with a convex cover in the cross sectional view, but the cover may also be largely concave and provide a water flow route that would enable dust and water to flow off the cover and channel water, past the battery box 158, and toward the ground 100. The battery box 158 and battery 151 are shown resting on the ground 100. Thermal contact 154 between the battery and the ground 100 enables the battery 151 to dissipate heat in charging and discharge into the thermal mass of the ground.

The central space under the photovoltaic panel 3 is shadowed from direct sunshine while the panel 3 can view and radiate to the sky. Thus, such a space may be cooled by radiation to the night sky and not heated by direct sunlight may stay cooler than the surroundings. The temperature difference can be increased by blocking and reducing the heat transfer from the surrounding air and materials that are heated by sunlight. By using the air spaces 10 inside the tire 35 as conduction thermal insulation or filling these spaces with thermal insulation, the space between the cover 150 and the battery 151 can be kept cooler than the surroundings. The battery box cover 150 may be transparent to infrared radiation to enhance the radiant cooling effect and increase air flow to cool the battery box when outside air temperatures fall. A baffled or collimating cover that has an infrared view of the sky and blocks the view of the back of the photovoltaic panel may enhance this radiation heat loss effect.

Laminate Actuator Valves 159, 160, 161 of U.S. Pat. No. 8,156,170 may be part of the cover 150 of the battery case 158. The Laminate Actuator Valves 159, 160, 161 may preferentially open when air temperatures drop to radiantly cool the surface of the battery and may close when air temperatures are high, blocking radiant heat to the battery 151 from the back of the photovoltaic panel 3, 22 and the sky. The laminate actuators 159, on apertures 160 as part of the battery box cover 150 may also permit air flow through the battery box 150, 158 when exterior air temperatures are low. A second barrier membrane of actuator valves 161 on the apertures 160 as part of the battery box cover 150 may close if temperatures drop below a set threshold to avoid excessive cooling at night. In colder climate regions, where only elevation of the average battery and electronics temperature is needed, the laminate actuators valves 159, 160, 161 could be set to open only when temperatures rise above a set threshold.

The battery 151 and electronics box 150, 158 could be used to store water 162 that is collected from the runoff of the photovoltaic panel 3. The water 162 may pass from the lower edge of the panel 3 through a channel 165 into the bladder 163 with low evaporation rates due to the low average temperature and largely sealed environment. Water filled bags 163, containers, or phase change materials may be packed in alongside the battery 151 or electronics to increase the thermal stability and heat dissipation characteristics of the central cavity. Food and medicines may be stored in the battery box 150, 158 to keep them cool and extend their preservation time. Metal plates or heat pipe plates may form part of the floor 154 or walls 156 of the battery cavity to dissipate heat throughout the battery cavity.

Figure 8:
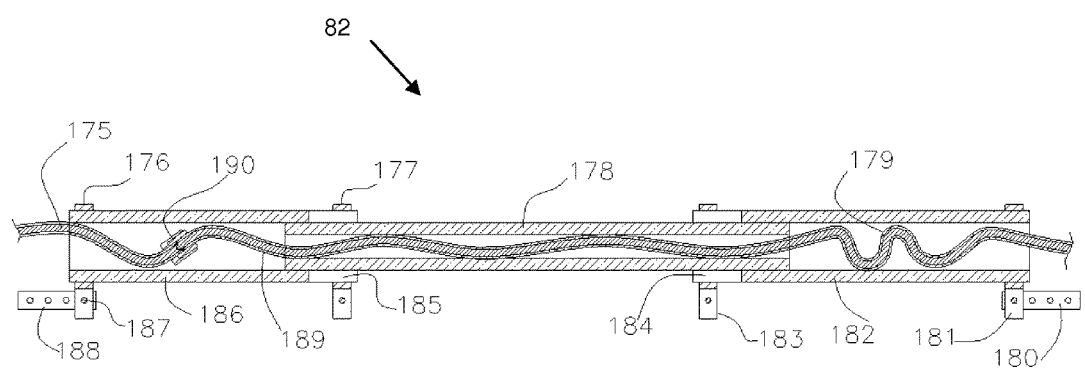
FIG. 8 shows telescoping conduit tubing.

FIG. 8 shows a cross-sectional view of a telescoping electrical conduit 82. The telescoping electrical conduit 82 may be formed from two polyvinylchloride (PVC) or steel conduit pipes, where the inside diameter of the larger pipes 186, 182 is sufficiently large to allow the inner pipe 178 to slip inside. In one embodiment example, typical clearances are PVC schedule 80 (0.225 inch wall thickness). The larger pipe 186, 182 may have a 1.90 inch inside diameter and the inner pipe may have a 1.88 inch outside diameter, resulting in a 0.010 inch average wall clearance. In a second embodiment example, steel conduit pipe wall with a thickness of 0.0625 inches may be used, with an outer pipe 186, 182 having an inside diameter of 2.275 inches and an inner pipe 178 having an outside diameter of 2.20 inches, resulting in an average wall clearance of 0.037 inches. In installations using PVC tubing, the surface may be lubricated with a coating of Teflon powder to reduce sticking. Teflon powder also makes the joints very hydrophobic so as to repel water ingress.

The ends of the tubes 182, 186 that are slid over the inner conduit pipe 178 are slotted 184, 185 with a cut 0.125 inches wide on four opposite sides and back four inches along the pipe. Band clamps 175, 177, 181, 183 are slipped over the pipes. These band clamps 175, 177, 181, 183 may be glued or welded to the ends of the pipes 182, 186 to make installations and adjustments more convenient. The band clamps 176, 181 at the end of the pipe assemblies bolt to a four hole plate 180, 188 that is then bolted to the plate that holds the micro-inverters and the photovoltaic panels. The telescoping electrical conduit 82 may be installed with dielectric insulated 189, metallic electrical cable 175, or cables pulled through the conduit with the outer diameter tubes 182, 186 and then pulled over the inner tube 178. Micro-inverters 37 typically come with a stock size cable 175 and connectors 190 built into the inverter that will enable most manufactured photovoltaic panels 3 to be placed side-by-side with a length of excess cable 175.

The telescoping conduit 82 may have extra space inside to accommodate coiling the excess cable 175 inside the conduit and 82 to avoid exposing the cable 175 to UV light exposure and unintentional contact. The telescoping conduit 82 can adjust the distance between the micro-inverters 37 to accommodate a range of distance between the panels 3.

The electrical interconnection 190 is made with a cable connector. The outer tubes 186, 182 are then slid over the cable 175 with slack cable being coiled 179 and folded into the volume of the conduit 82. The end clamps 180 are bolted 187 to the plates and attached to the micro-inverter 37 and the photovoltaic panels 3. All the band clamp bolts 187 and nuts are tightened once the inner tube 178 is deemed to be sufficiently within the two outer tubes 186, 182, and the distance between the photovoltaic panels 3 is such that the cable 175 is not stressed and the panels 3 do not impact each other. The panels 3 may be disconnected by loosening the bolts 187 on the band clamps 176, 177 on either side of a connector 190 and sliding off the inner tube 178 to access the connector 190 for disconnection.

Figure 9:
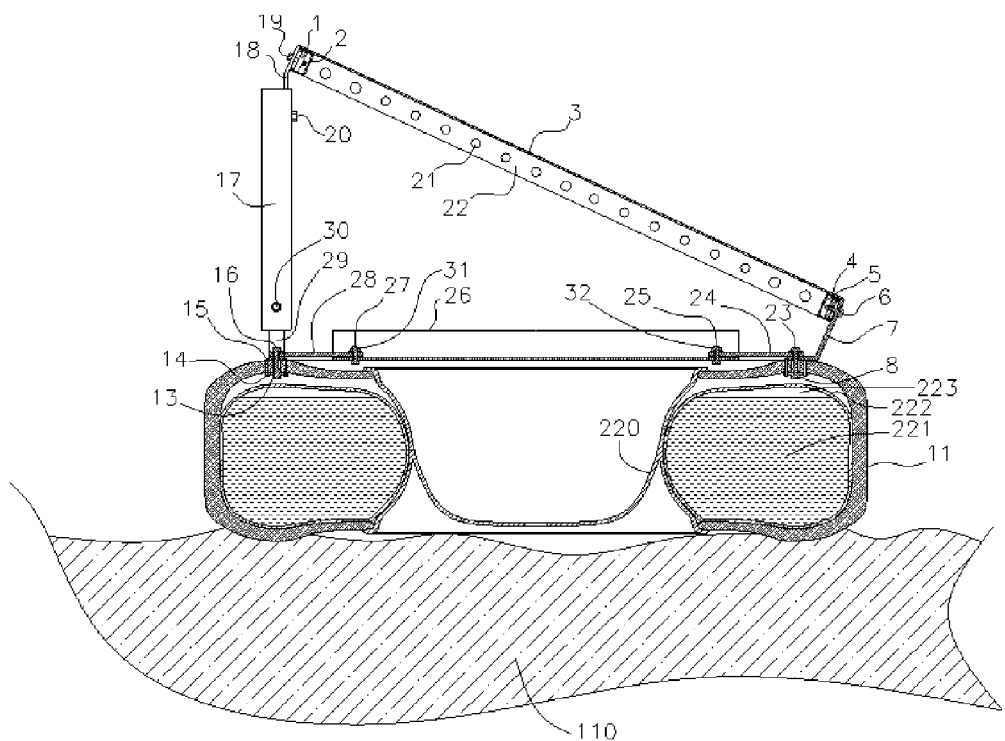
FIG. 9 shows a water bladder ballasted tire mount.

FIG. 9 shows a cross-sectional view of a photovoltaic panel 3 mounted on a rubber tire 11 and wheel 220, with the tire 11 filled with a bladder 222 filled with liquid or gel 221. In some installations, such as flat roof 110 mounting, minimal surface disturbance may be achieved by rolling the empty tires 11 on the roof 110 and then filling the tires with water 221. This method may cause very low surface wear and impact ballasting.

A rubber bladder 222, such as a rubber truck tire inner tube, may be placed inside the tire cavity and the steel wheel is centered in the tire. The tire 11 is rolled to the placement point. The rubber bladder 222 is filled with water 221, and the side walls of the tire 11 seat on the inner rim of the wheel 220. If water freezes and expands within the bladder, rubber bladders 222 and the rubber tire 11 may have a sufficiently wide elastic range to enable them to accommodate the expansion of the ice without tension failure that may occur with plastic, metal or ceramic containers.

A small air cavity 223 is left in the bladder 222 to accommodate expansion and avoid pressing the bladder 222 onto the Hanger flanges 8, 13 and fasteners 14, 15, 16, 23. As an alternative to liquid water, hydrogels or foams 221 may be used inside the rubber bladder 222. In this case, use of a gel or foam may stabilize the position of the liquid 221 and reduce the leakage rate from the rubber bladder 222 if there is a leak. Filling the tires 11 with light weight, closed cell foams may be useful in areas where flooding is a possibility, and could allow the tire 11 to float, protecting the photovoltaic cells 3, electronics, and cables 175. A plastic bladder and plastic tube may replace the rubber bladder 222 and steel wheel 220.

The Hanger flange 8, 13 is bolted to the bent plates 7, 24, 28, 29, 18, and tube struts 17, 20, 25, 26, 27, 30, 31, 32 are bolted to channel beams 2, 4. Sliding nuts 1, 5 may be used to mount the heat sink reinforced photovoltaic panel 3 to the ballasted rubber tire 11.

Figure 10:
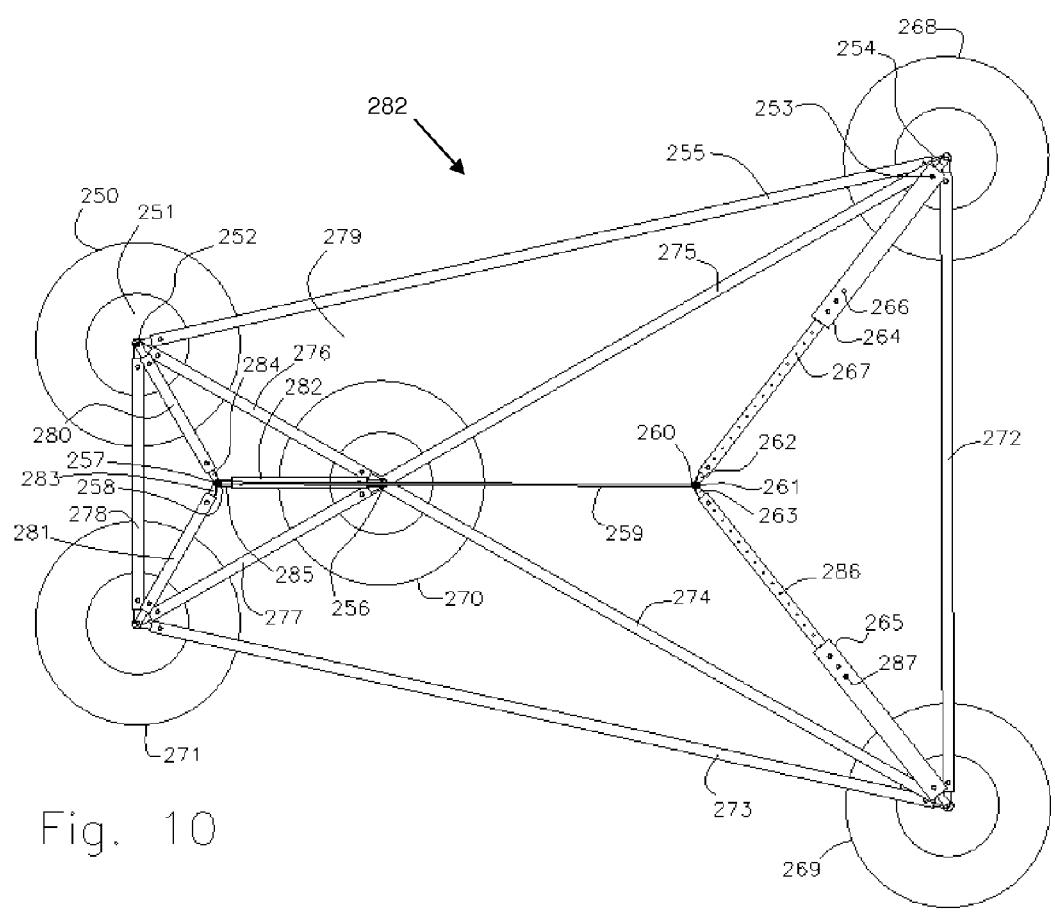
FIG. 10 shows a polar axis rotating photovoltaic panel mount with multiple rubber tire pads.

FIG. 10 shows an aerial view of a large polar axis tracking strut array 282 mounted on concrete or wheeled rubber tires 250, 268, 269, 270, 271. The tires 250, 268, 269, 270, 271 are filled with concrete 251 with central tube shaft 111 as described in FIG. 5. The tire mounts 250, 268, 269, 270, 271 are rolled onto the fielding position. Bolts 252 are attached to the tires when the plane of the rubber tires 250, 268, 269, 270, 271 is parallel to the ground 279.

Eight struts 255, 272, 273, 274, 275, 276, 277, 278 that may be parallel to the ground plane 279 are mounted with bolts 252 to the rubber tires 250, 268, 269, 270, 271 to form four strut triangles. A beam crossing joint 256 may be formed in the center of the four strut triangles by welding tubes together. In high wind zones, ground screws may replace bolts 252 to secure each tire mount 250, 268, 269, 270, 271 to the ground 279. At each tire mount 250, 268, 269, 270, 271 the securing bolt 252 goes through bent plates 254 of each tube strut that are attached to the tube struts with a bolt 253. The angles of the bent plates 254, 262, 263 correspond to the angle of the tube struts 255, 266, 265, 272, 273, 274, 275, 276, 277, 278, 280, 281, 282.

On the left side of FIG. 10, six struts 276, 277, 278, 280, 281, 282 form a tetrahedron on three rubber tire mounts 250, 270, 271. Joining of the three bent plates 283, 284, 285 forms the elevated pivot point of the assembly 282. At the peak of the tetrahedron, three bent plates 283, 284, 285 are bolted to the rotation axial rod 259 through two axial nuts 257, 258 on either side of twisted bent plates 283, 284, 285. At the opposite end of the rotation axial rod 259, the axial rod may be placed through two twisted plates 262, 263 and secured with two axial nuts 260, 261. A bearing and rack with photovoltaic arrays 3 may be mounted on the axial rod 259.

In one embodiment, the axial rod 259 corresponds to the longitudinal angle of the installed site such that it parallel to the rotation axis of the earth. The axial rod tilt angle may be adjusted by changing the length of the two back struts 264, 265. Adjustment may be accomplished by sliding the small diameter tube struts 267, 286, each with a series of holes to match through holes 266, 287, into the larger diameter tube struts 264, 265. The large diameter struts 264, 265 are then bolted to the small diameter tube struts 267, 286 when the desired axial rod tilt is reached.

The two back telescoping struts 264, 265 may be seasonally adjusted to track the 47 degree range of solar declination by changing the bolts to hole positions 267, 286 in the tube struts. Alternatively, the two back struts 264, 265 may be linear actuators and automatically adjust to the solar declination plane. In this case, axial nuts 257, 258, 260, 261 coupling to the axial rod shaft 259 would be replaced with ball joints bolts coupled to the axial rod shaft 259.

Some features of the invention include, without limitation:

Rubber tires on their sides
Holes drilled into the rubber tires
Plates or disks on inside of tire
Bolts or rivets going through the walls of tire
Fastener go through walls of tires of expanding bolts, ratchet fasteners, harpoon fasteners, screws, and welds
Glues used to secure to the rubber tires
Plates and/or tubes, strut beams mounted to the tire
Plates, tubes, or beams attached to photovoltaic panels
Electrical conduits mounting to the attachment points or the plates, tubes, or beams
Batteries held inside the cavity of rubber tire
Electronics held inside the cavity of rubber tire
Heat sink fins/or beams mounted to the back side of photovoltaic panel
Channel beam framing of panels with flush glue and lipless mounting
Fill of soil, concrete, water, aggregate, stones, inside tire
Central tube or beam mounted in center of tire with concrete
Thermal insulation or buoyancy material filled inside tires.

The battery compartment with battery weighting can form a weighted keel for the buoyant material loaded tire or gas inflated bladder inside tire, and a photovoltaic array on top of tire to enable the system to stably float on water
Painting the tire
Ground screws holding down tire
Conduits between tires and panels to protect electrical wiring
Telescoping conduits to enable protection and concealment of excess wire and permit flexible assemblies
Telescoping struts with pin positions can enable angular tilt in the panels mounting and seasonal adjustments
Optimizing electronics mounted to panels or rubber tires
Wheels used inside the rubber tires.
Bearings mounted to rubber tire
Actuators mounted to rubber tires
Actuators mounted to the photovoltaic panels
Pivot on the mounted tire
Posts mounted to rubber tire
The rubber tire is mounted with the tire on its side with the axis of symmetry (former wheel axis) going into to the ground
Photovoltaic panels with beams mounted on the surface opposite the photovoltaic cell
The beams mounted to the walls of the rubber tire enable a soft elastic mount that helps the panels and attachments spread out mechanical shocks minimizing sudden forces such as wind gusts, earthquakes, and hail
By mounting the beams to the back of the photovoltaic panels the panels can have no lip over the edge of the photovoltaic panel and avoiding a dirt buildup within the conventional frame lip. The mounting system of plates and struts with the photovoltaic panels should have a primary resonate frequency higher than 1 hertz to avoid wind flutter oscillations
The mounting plates on the inside of the rubber tires can be riveted, glued or bolted to the walls of the tire such that the outer surface of the tire is smooth and enables the tires to be rolled when the struts, beams or outer plates are not attached
The mounting plates on the inside of the rubber tires can be taped to mate to bolts from the outer surface plates, beams or struts
The positions and angles of the struts or beams attached between the beams panels and the rubber tires are such that they form triangles
Drain holes in sidewalls of rubber tire to eliminate water puddling inside tire.
Shaping the ground to tilt the panels
Multiple tires attached to each other to form taller mounts
Backing plates to the photovoltaic panels also form the plates to the rubber tires
Batteries and/or fuel cells mounted inside the rubber tires
Thermal insulation placed within the tires
A protective cover over the batteries covers the top of the tire and attached to the rubber tire
The protective cover over the batteries can also form the racking mount to the photovoltaic panel
A molded lower cover can fit inside the center hole of the tire and rest on the ground
Laminate actuating valves in the wall of the central compartment can act to allow air flow heat transfer and/or infrared emission heat transfer from the battery compartment
Battery mounted inside the tire is in thermal contact with the ground
A heat pipe and metal plates into the ground under the batteries increases the thermal contact and temperature stability of the battery. Heat pipes without wicks can also act as a one way heaters when temperatures in the top of the pipe are low to move heat from the ground to the batteries
A phase change material located in the central cavity of the tire
A water jacket within the tire and around the battery and electronics to obtain thermal stability and ballast
Filling a bladder (inner tube) inside the tire with water as ballast
Rubber bladders can withstand freezing water expansion without bursting
Rain water and dew condensation off photovoltaic panel collected and stored into a cistern inside the inner cavity of the rubber tire.

While the invention has been described with reference to specific embodiments, modifications and variations of the invention may be constructed without departing from the scope of the invention.

I claim:

1. A photovoltaic cell array apparatus, comprising:
a plurality of photovoltaic cells laminated in one or more photovoltaic panels;
one relocatable rubber tire forming a portable and transportable mount;
wherein the one or more photovoltaic panels are mounted on the one rubber tire;
a plurality of fasteners fixedly attached to walls of the one rubber tire;
a plurality of tubular struts with fixedly attached bent end plates connected to the plurality of fasteners;
wherein the plurality of struts create a support structure for mounting the one or more photovoltaic panels;
wherein the one rubber tire is on a placement surface; and
wherein a plane of at least one part of the one rubber tire is in contact with a plane of the placement surface after the one rubber tire is disposed on the placement surface.

2. The photovoltaic cell array apparatus of claim 1, wherein the fasteners are bolts, rivets, screws, expanding bolts, harpoons, pins, or welds.

3. The photovoltaic cell array apparatus of claim 1, wherein the fasteners are fixedly attached by means of concrete, polymeric material, or rubber adhesives.

4. The photovoltaic cell array apparatus of claim 1, wherein the fasteners are fixedly attached by passing the fasteners through holes drilled in the walls of the one tire.

5. The photovoltaic cell array apparatus of claim 1, wherein the photovoltaic panels are planar in shape.

6. The photovoltaic cell array apparatus of claim 1, wherein the struts are formed by plates fastened to the fasteners and tubes connected to the plates.

7. The photovoltaic cell array apparatus of claim 1, wherein the support structure supports one or more photovoltaic panels above the one rubber tire.

8. The photovoltaic cell array apparatus of claim 1, wherein one or more ground screws anchor the one rubber tire to the placement surface.

9. The photovoltaic cell array apparatus of claim 1, wherein the support structure rotates with respect to the one rubber tire.

10. The photovoltaic cell array apparatus of claim 7, wherein the one or more photovoltaic panels rotate with respect to the one rubber tire.

11. The photovoltaic cell array apparatus of claim 1, wherein an interior cavity of the one rubber tire houses one or more electronic devices.

12. The photovoltaic cell array apparatus of claim 11, wherein the electronic devices are batteries, fuel cells, and electrical wiring.

13. The photovoltaic cell array apparatus of claim 11, wherein the electronic devices are contained within in a depression formed within the interior cavity of the one rubber tire.

14. The photovoltaic cell array apparatus of claim 1, wherein an interior cavity of the one rubber tire is filled with a thermal insulating material.

15. The photovoltaic cell array apparatus of claim 14, wherein the thermal insulating material is selected from the group consisting of water, hydrogel, materials having phase change property, or materials with heat capacity property.

16. The photovoltaic cell array apparatus of claim 1, wherein an interior cavity of the one rubber tire is filled with dirt, water, concrete, rock, sand, or a water-filled bladder.

17. The photovoltaic cell array apparatus of claim 1, wherein an interior cavity of the one rubber tire is filled with a buoyant material.

18. The photovoltaic cell array apparatus of claim 1, wherein one or more ventilation holes are drilled into tire walls of the one rubber tire.

19. The photovoltaic cell array apparatus of claim 18, wherein the one or more ventilation holes are covered by temperature actuated valves.

20. The photovoltaic cell array apparatus of claim 1, wherein an interior cavity of the one rubber tire is enclosed by a cover.

21. The photovoltaic cell array apparatus of claim 1, wherein the one rubber tire are painted.

22. The photovoltaic cell array apparatus of claim 1, further comprising one or more telescoping conduits and electrical wiring for the one or more photovoltaic panels contained within the one or more telescoping conduits.

23. The photovoltaic cell array apparatus of claim 22, further comprising one or more DC-AC conversion inverters, wherein the one or more telescoping conduits contain the electrical wiring from the one or more DC-AC conversion inverters.

24. The photovoltaic cell array apparatus of claim 22, wherein the one or more telescoping conduits provide adjustable struts that position the one or more photovoltaic panels.

25. The photovoltaic cell array apparatus of claim 1, wherein the one or more photovoltaic panels are positioned by linear actuators.

26. The photovoltaic cell array apparatus of claim 1, wherein the one or more photovoltaic panels are positioned by electric motors.

27. The photovoltaic cell array apparatus of claim 1, wherein water is collected from the one or more the photovoltaic panels and the water is stored within one or more interior cavities of the one rubber tire.

28. The photovoltaic cell array apparatus of claim 1, wherein a heat pipe in contact with the surface is placed inside one or more interior cavities of the one rubber tire.

29. The photovoltaic cell array apparatus of claim 1, wherein heat sinks and plates are attached the one or more photovoltaic panels and are connected to tops of the struts.

30. The photovoltaic cell array apparatus of claim 29, wherein the heat sinks, plates, and struts are made of steel, aluminum, PVC, fiberglass plastic composites, or dielectric material.

31. A photovoltaic cell array mounting apparatus, comprising:
  laminating plurality of photovoltaic cells in one or more photovoltaic panels;
  one relocatable rubber tire forming one or more portable and transportable mounts;
  wherein the one or more photovoltaic panels are mounted on the one rubber tire;
  fixedly attaching a castable material to walls of the one rubber tire;
  connecting a support structure to the castable material;
  wherein the support structure is a tubular structure that mounts to the castable material and the tubular structure attaches to one or more photovoltaic panels;
  wherein the one rubber tire is on a placement surface; and
  wherein a plane of at least one part of the one rubber tire is in contact with a plane of the placement surface after the one rubber tire is on the placement surface.

32. The photovoltaic cell array apparatus of claim 31, wherein a container is held by the cast able material to hold electronics and/or energy storage means.

33. The photovoltaic cell array apparatus of claim 31, wherein the cast able material is concrete, polymeric foam, polymer, rubber, rubber or glue.

34. The photovoltaic cell array apparatus of claim 31, wherein the support structure are plate, plates, tube, tubes, beam, beams, pedestal, pedestals, bladder, bladders, box, boxes, compartment, compartments, or combinations of thereof.

35. The photovoltaic cell array apparatus of claim 31, wherein the apparatus floats on water.

* * * * *